Dec. 9, 1958 C. H. JONES 2,863,939

COLOR RECEIVER

Filed Feb. 14, 1955 4 Sheets-Sheet 1

WITNESSES:

E. A. McCloskey

J. J. Callahan

INVENTOR

Charles H. Jones.

BY F. E. Browder

ATTORNEY

Dec. 9, 1958 C. H. JONES 2,863,939

COLOR RECEIVER

Filed Feb. 14, 1955 4 Sheets-Sheet 2

| | | Color Switching Period | | | | | | | | | |
|---|---|---|---|---|---|---|---|---|---|---|---|
| Frame | | 1 | | 2 | | 3 | | 4 | | 5 | |
| Field | | 1 | 2 | 3 | 4 | 5 | 6 | 7 | 8 | 9 | 10 |
| Pattern Line Number | 1 | G | | B | | R | | G | | B | |
| | 2 | | R | | G | | B | | R | | G |
| | 3 | R | | G | | B | | R | | G | |
| | 4 | | B | | R | | G | | B | | R |
| | 5 | G | | B | | R | | G | | B | |
| | 6 | | R | | G | | B | | R | | G |
| | 7 | B | | R | | G | | B | | R | |
| | 8 | | G | | B | | R | | G | | B |
| | 9 | G | | B | | R | | G | | B | |
| | 10 | | R | | G | | B | | R | | G |
| | 11 | R | | G | | B | | R | | G | |
| | 12 | | B | | R | | G | | B | | R |
| | 13 | G | | B | | R | | G | | B | |

Dec. 9, 1958 C. H. JONES 2,863,939

COLOR RECEIVER

Filed Feb. 14, 1955 4 Sheets-Sheet 4

United States Patent Office 2,863,939

Patented Dec. 9, 1958

2,863,939

COLOR RECEIVER

Charles H. Jones, Churchill, Pa., assignor to Westinghouse Electric Corporation, East Pittsburgh, Pa., a corporation of Pennsylvania Application February 14, 1955, Serial No. 487,883

15 Claims. (Cl. 178—5.4)

This invention relates to color television receivers of the line sequential type, and has as an object to improve such receivers.

In line sequential receivers, the primary colors are assigned to individual lines in the scanning pattern, and the color sequence is introduced as successive lines are scanned. Prior receivers of this type have been unsatisfactory because of objectionable color crawl and flicker.

This invention provides a color television receiver of the line sequential type in which the color switching is accomplished during horizontal retrace. A switching sequence is provided which reduces objectionable color crawl and flicker. The switching power required is relatively small.

Another object of this invention is to reduce color crawl in television receivers of the line sequential type.

Another object of this invention is to reduce the power required for color switching in color television receivers of the line sequential type.

This invention will now be described with reference to the drawings, of which:

Figs. 3A to 3M are a plot of voltage wave forms;

Throughout the drawings, like reference characters refer to like elements in the various figures.

In a standard television receiver using interlaced scanning with a horizontal line frequency of 15,750 cycles per second (C. P. S.), the field rate is 60 C. P. S. and the frame rate is 30 C. P. S. Horizontal retrace occurs in a 10.2 microsecond interval following a horizontal sweep interval of 63.5 microseconds.

Figure 1:
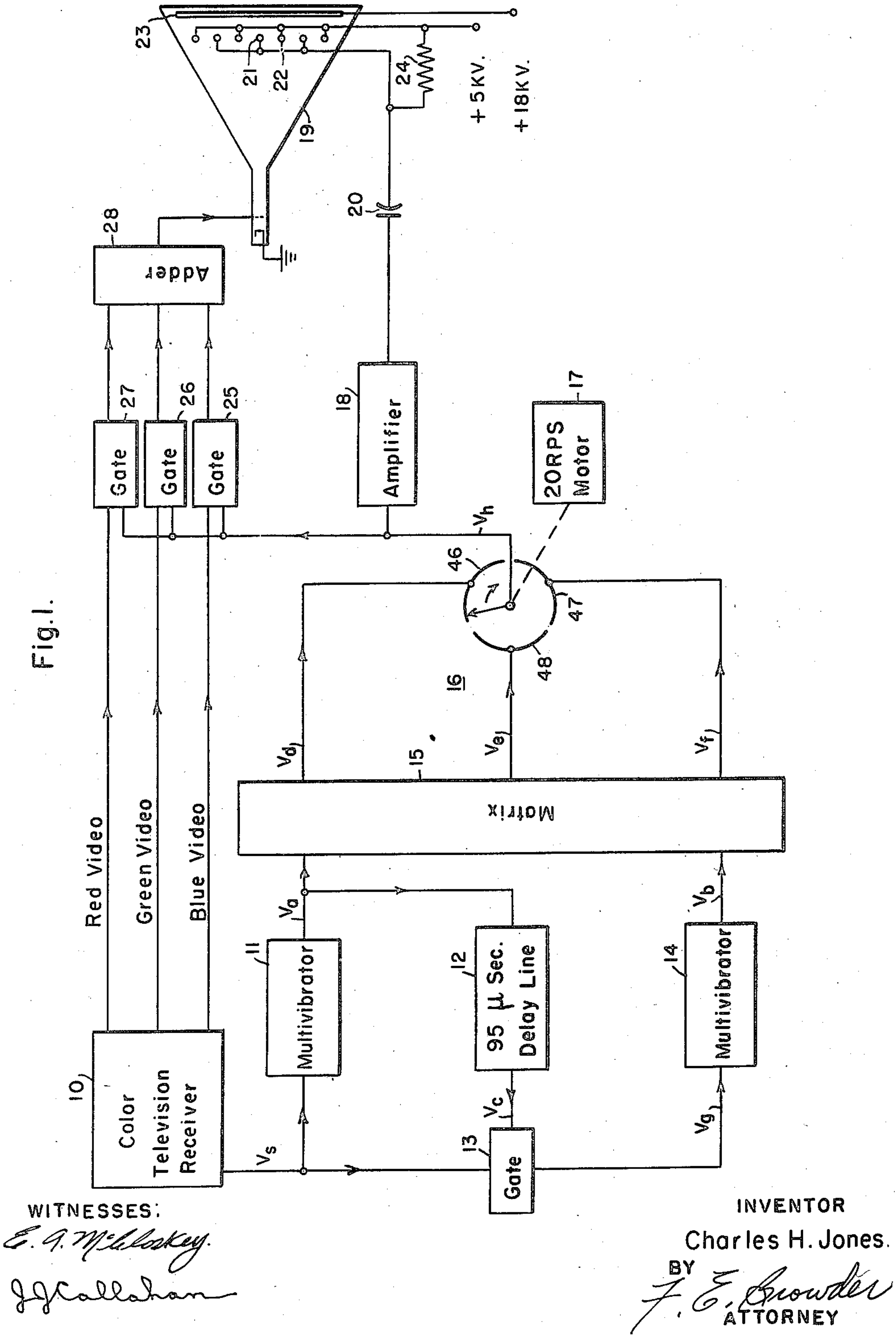
Figure 1 is a block diagram illustrating one embodiment of this invention.
Figure 3A:
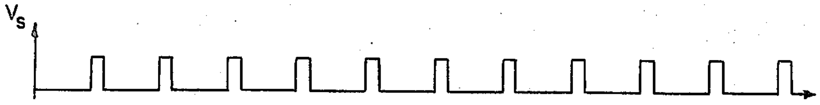
Figure 3B:
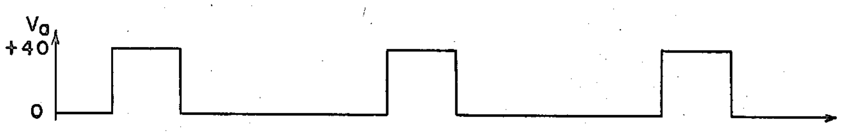
Figure 3C:
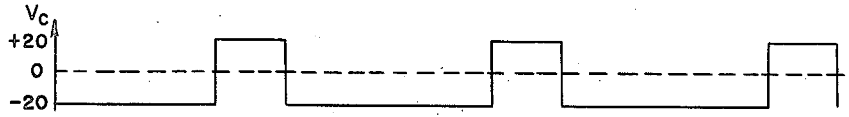
Figure 3D:
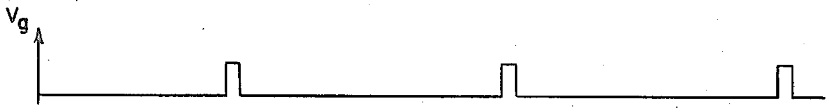
Figure 3E:
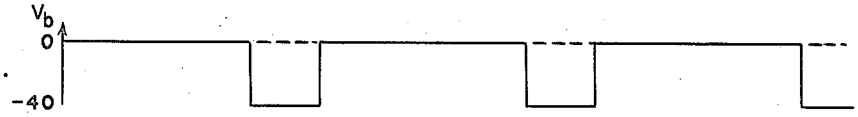

The receiver 10 of Fig. 1 is such a standard receiver and includes a sync pulse generator which delivers a horizontal sync signal $V_s$, shown by Fig. 3A, which initiates horizontal trace in the usual manner, and which triggers a flip-flop multivibrator 11 which supplies a signal $V_a$ having the wave form shown by Fig. 3B, one of the two tube sections of the multivibrator 11 conducting for one horizontal sweep period, followed by the other tube section conducting for three horizontal sweep periods. The signal $V_a$ is delayed for 95 microseconds by a delay line 12 to produce a signal $V_c$ illustrated by Fig. 3C, which in a gate 13 gates the sync signal $V_s$ to produce a pulse $V_g$ which occurs once for every four sync signals as illustrated by Fig. 3D. The pulse $V_6$ triggers a one-shot multivibrator 14 which delivers a signal $V_b$, one tube section of the multivibrator 14 conducting for one horizontal sweep period following the pulse $V_g$, and its other tube section then conducting for three horizontal sweep periods as illustrated by Fig. 3E. The signal $V_b$ is similar to $V_a$ except that it is inverted and is delayed for a period equal to two horizontal sweep periods.

Figure 3F:
Figure 3G:
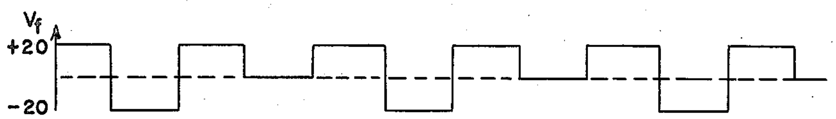
Figure 3H:
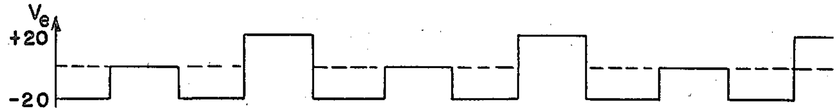

The signals $V_a$ and $V_b$ are delivered to a matrix 15 to provide three output signals $V_d$, $V_e$ and $V_f$, in which:

$$V_d=\frac{V_a}{2}+\frac{V_b}{2}$$

$$V_e=\frac{V_a}{2}-V_b-k$$

$$V_f=\frac{V_b}{2}-V_a+k$$

where $k$ is a constant direct current voltage of 20 volts. The wave forms of $V_d$, $V_e$ and $V_f$ are illustrated by Figs. 3F, 3H and 3G, respectively.

It will be noted $V_d$ has a 0 value during the first horizontal line and during every second line thereafter; has a +20 value during the second horizontal line and during every fourth line thereafter, and has a —20 value during the fourth horizontal line and during every fourth line thereafter.

Voltage $V_e$ has a —20 value during the first horizontal line and during every second line thereafter, has a 0 value during the second horizontal line and during every fourth line thereafter, and has a +20 value during the fourth horizontal line and during every fourth line thereafter.

Voltage $V_f$ has a +20 value during the first horizontal line and during every second line thereafter; it has a —20 value during the second horizontal line and during every fourth line thereafter, and it has a 0 value during the fourth horizontal line and during every fourth line thereafter.

The voltages $V_d$, $V_e$ and $V_f$ are supplied to a three-position, single-pole switch 16 which is rotated at 20 C. P. S. by a motor 17 to provide a switching rate of 60 C. P. S. corresponding to and synchronized with the field rate. An electronic switching device may be employed in place of the switch 16. The output signal $V_h$ from the switch 16 is amplified in an amplifier 18 which has an amplification factor of 20, and supplied to a color control electrode or one set of deflection wires 21 of a deflection focus grid color tube 19. Another set of deflection wires 22 is connected to a +5 kilovolt source, and a phosphor plate screen 23 is connected to a +18 kilovolt source. A coupling capacitor 20 is connected between the deflection wires 21 and the amplifier 18, and a resistor 24 is connected between the two sets of deflection wires 21 and 22.

The deflection focus grid color tube 19, such as described in an article entitled "Compatible Color Picture Presentation with the Single Gun Tricolor Chromatron," by Gow and Dorr in the January 1954 issue of the Proceedings of the I. R. E., has a phosphor screen with a large number of fine, equally spaced, parallel lines, one line fluoresces in red when impacted by the electron beam of the tube, another line fluoresces in green when impacted by the electron beam, and another line fluoresces in blue when impacted by the electron beam. When +400 volts is applied to the deflection wires of the tube, the electron beam is deflected against the red phosphor line, when 0 voltage is applied to the deflection wires, there is no deflection and the electron beam strikes the green phosphor line, and when —400 volts is applied to the deflection wires, the electron beam will be deflected against the blue phosphor line. The +20, —20 and 0 voltages $V_h$ delivered by the switch 16 to the amplifier 18 will be amplified to +400, —400 and 0 voltage respectively, by the amplifier 18 and delivered to the deflection wires of the tube 19 to switch colors in the sequence which will be described later.

The voltages $V_h$ are also applied to the gates 25, 26 and 27 to which the blue, green and red color signals respectively from the receiver 10 are also applied.

Figures 2, 4:
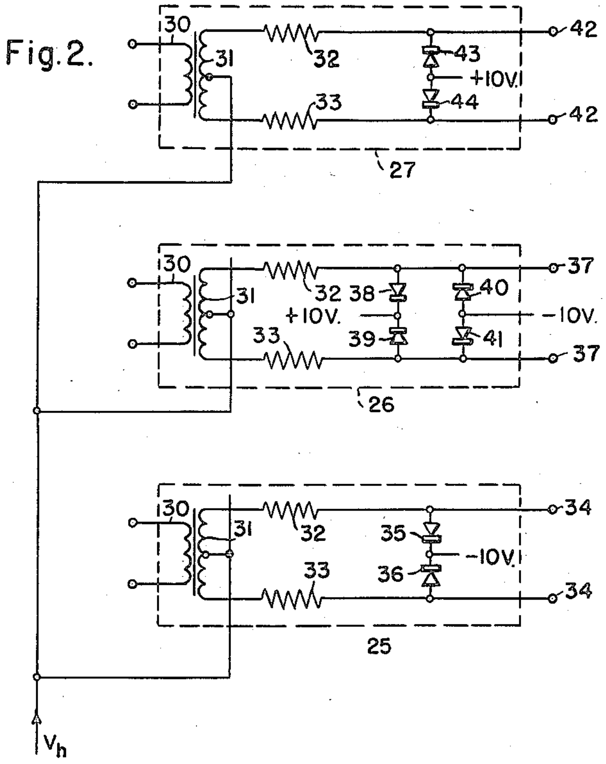
Fig. 2 is a circuit schematic showing the circuit components used in the color signal gates of Fig. 1.
Fig. 4 is a chart showing the color switching sequence.

The outputs of the three gates 25, 26 and 27 are added in an adder 28 and supplied to a control grid of the tube 19. The details of the gates 25, 26 and 27 are shown in Fig. 2. The gates contain similar input transformers having primary windings 30 and center tapped secondary windings 31, the center taps of which are connected to the switch 16 to receive the gating voltage $V_h$.

The gate 25 has the resistors 32 and 33 connected between the ends of its secondary winding 31 and its output connections 34. The two diodes 35 and 36 are connected in series, back-to-back, to the output connections. The junction connection of the diodes 35 and 36 is connected to a −10 volt direct current source. When the gating signal $V_h$ is −20 volts, the gate 25 will pass a blue signal.

The gate 26 has a similar resistor 32 and a similar resistor 33 connected between the ends of its secondary winding 31 to its output connections 37, and has the diodes 38 and 39 connected in series, back-to-back to the output connections 37. The junction connection of the diodes 38 and 39 is connected to a +10 volt direct current source. The oppositely poled diodes 40 and 41 are also connected in series, back-to-back, to the output connections 37, and their junction connection is connected to a −10 volt direct current source. When the gating signal $V_h$ is at 0 volt, the gate 26 will pass a green signal.

The gate 27 has the resistors 32 and 33 connected between the ends of its secondary windings 31 and its output connections 42, and has the diodes 43 and 44 connected in series, back-to-back, to the output connections 42. The junction connection of the diodes 43 and 44 is connected to a +10 volt direct current source. When the gating signal $V_h$ is +20 volts, the gate 27 will pass a red signal.

Assume before the start of the first horizontal line of the first field, the color is to be switched to green. Before the first sync pulse starts horizontal trace, the voltage $V_d$ will be 0 as illustrated by Fig. 3F. Assuming the rotor of the switch 16 touches the forward edge of the switch sector 46 at this time, to which sector the voltage $V_d$ is delivered from the matrix 15, then the switch 16 will deliver a voltage $V_d=0$ to the amplifier 18 and through the amplifier to the deflection wires of the color tube 19. At the same time, the 0 voltage gating signal $V_h$ gates the gate 26 to pass the green color signal. The electron beam in the color tube strikes the green phosphor line at the same time the green color signal is applied to the grid of the color tube. This is repeated every second horizontal line following the first when $V_d=0$ as illustrated by Fig. 3F, the rotor of the switch 16 remaining on the switch sector 46 during the first field.

Before the start of the second line (the third line of the pattern shown in Fig. 4), and before the sync pulses $V_s$ start horizontal trace, the voltage $V_d$ will be +20 as shown by Fig. 3F. The rotor of the switch 16 will still be on the sector 46 so that +20 volts will be delivered to the amplifier 18 where it will be amplified to +400 volts and applied to the deflection wires of the tube 19 at the same time that $V_h$ gates the gate 27 to pass the red color signals. Thus, the electron beam in the color tube strikes the red phosphor line at the same time the red color signal is applied to the grid of the color tube. This is repeated every fourth horizontal line following the second (every eighth line following the third line of the pattern as shown in Fig. 4) when $V_d=+20$ as illustrated by Fig. 3F.

Before the start of the fourth line (the seventh line of the pattern shown in Fig. 4) and before the sync pulses start horizontal trace, the voltage $V_d$ will be −20 as shown by Fig. 3F. The rotor of the switch 16 will still be on the sector 46 so that −20 volts will be delivered to the amplifier 18 where it will be amplified to −400 volts and applied to the deflection wires of the tube 19 at the same time that $V_h$ gates the gate 25. The electron beam in the color tube strikes the blue phosphor line at the same time the blue color signal is applied to the grid of the color tube. This is repeated every fourth horizontal line following the fourth (every eighth line following the seventh line of the pattern as shown in Fig. 4) when $V_d=-20$ as illustrated by Fig. 3F.

Thus, during the first field, the color will be switched during horizontal retrace from green to red, to green, to blue, to green, to red, to green, to blue, and so on as shown by Fig. 4.

At the start of the second field, the rotor of the switch 16 will touch the forward edge of the switch sector 47 which receives the voltage $V_f$ from the matrix 15. The sync signal $V_s$, at the beginning of the first horizontal line of the second field (the second horizontal line of the pattern) and every second line thereafter will start horizontal trace. Before this time, the voltage $V_f$ will be +20 as illustrated by Fig. 3G which will be amplified by the amplifier 18 to +400 volts and applied to the deflection wires of the tube 19. The gating voltage $V_h$ gates the gate 27 to pass the red color signal so that the red color signal will be applied to the control grid of the color tube 19 at the same time the electron beam in the tube is deflected against the red phosphor line.

Before the start of the second horizontal line of the second field (the fourth horizontal line of the pattern) and every fourth line thereafter, $V_f$ is −20 volts as shown by Fig. 3G. The rotor of the switch 16 will remain on the switch sector 47 during the second field so that −20 volts will be supplied by the switch 16, amplified to −400 volts by the amplifier 18 and applied to the deflection wires of the tube 19. The gating voltage $V_h$ gates the gate 25 to pass the blue color signal. The blue color signal thus will be applied to the grid of the color tube at the same time its electron beam is deflected against the blue phosphor line.

Before the start of the fourth line of the second field (the eighth line of the pattern) and every fourth line thereafter, the voltage $V_f$ will be 0 as shown by Fig. 3G. The rotor of the switch 16 will still be on the sector 47 so that 0 volt will be delivered through the amplifier 18 to the deflection wires of the tube 19. The 0 voltage gating signal $V_h$ will gate the gate 26. The green color signal thus will be applied to the grid of the color tube at the same time its electron beam strikes the green phosphor line.

Thus, during the second field, the color will be switched from red to blue, to red, to green, to red, to blue, to red, to green, and so on as shown by Fig. 4.

Before the beginning of the first horizontal line of the third field and every second line thereafter, the voltage $V_e$ will be −20 as illustrated by Fig. 3H. At the start of the third field, the rotor of the switch 16 will touch the forward edge of the switch sector 48 which receives the voltage $V_e$ from the matrix 15. The rotor of the switch 16 will remain in contact with the switch sector 48 throughout the third field. The switch 16 will supply −20 volts to the amplifier 18 which will increase this voltage to −400 volts and the amplifier 18 will supply the latter voltage to the deflection wires of the tube 19. At the same time the gating signal $V_h$ of −20 volts will gate the gate 25 to pass the blue color signal so that it will be applied to the grid of the color tube 19 at the same time the electron beam is deflected against the blue phosphor line. This will be repeated every second line following the first line of the third field when the voltage $V_e$ is −20 as illustrated by Fig. 3H.

Before the beginning of the second horizontal line of the third field and every fourth line thereafter, $V_e$ is 0 as shown by Fig. 3H. The switch 16 will deliver a 0 voltage to the amplifier 18 so that 0 volt will be supplied to the deflection wires of the color tube 19. At the same time the switch 16 will deliver a 0 gating voltage to the gate 26 to pass the green color signal. The green color signal will thus be applied to the grid of the tube 19 at the same time the electron beam strikes the green phosphor line.

Before the start of the fourth horizontal line of the third field and every fourth line thereafter, $V_e$ is +20 as shown by Fig. 3H. The switch 16 will deliver a +20 voltage to the amplifier 18 which will increase this voltage to +400 volts and the amplifier 18 will supply the latter voltage to the deflection wires of the tube 19. At the same time the gating signal $V_h$ of +20 volts will gate the gate 27 to pass the red color signal. The red color signal will thus be applied to the grid of the tube 19 at the same time the electron beam strikes the red phosphor line.

Thus during the third field the signal will be switched from blue to green, to blue, to red, to blue, to green, to blue, to red, and so on as shown by Fig. 4.

Before the start of the first line of the fourth field (the second line of the pattern) and every second line thereafter, $V_d$ is zero as shown by Fig. 3F. The rotor of the switch 16 will again be touching the forward edge of the switch sector 46 to which $V_d$ is supplied by the matrix 15. The switch 16 will deliver a 0 voltage to the amplifier 18 so that 0 volt will be supplied to the deflection wires of the color tube 19. At the same time the switch 16 will deliver a gating voltage of 0 volt to the gate 27 to pass the green color signal. The green color signal will thus be applied to the grid of the tube 19 at the same time the electron beam strikes the green phosphor line.

Before the start of the second line of the fourth field (the fourth line of the pattern) and every fourth line thereafter, $V_d$ is +20 as shown by Fig. 3F. The switch 16 will deliver a +20 voltage to the amplifier 18 which will increase the voltage to +400 volts and the amplifier 18 will supply the latter voltage to the deflection wires of the tube 19. At the same time the gating signal $V_h$ of +20 volts will gate the gate 28 to pass the red color signal. The red color signal will thus be applied to the grid of the tube 19 at the same time the electron beam strikes the red phosphor line.

Before the start of the fourth line of the fourth field (the eighth line of the pattern) and every fourth line thereafter, $V_d$ is −20 as shown by Fig. 3F. The switch 16 will deliver a −20 voltage to the amplifier 18 which will increase the voltage to −400 volts and the amplifier 18 will supply the latter voltage to the deflection wires of the tube 19. At the same time the gating signal $V_h$ of −20 volts will gate the gate 25 to pass the blue color signal so that it will be supplied to the grid of the color tube 19 at the same time the electron beam is deflected against the blue phosphor line.

Thus during the fourth field the signal will be switched from green to red, to green, to blue, to green, to red, to green, to blue, and so on as shown by Fig. 4.

Before the beginning of the first line of the fifth field and every second line thereafter, the voltage $V_f$ will be +20 as shown by Fig. 3G. The switch 16 will deliver a +20 voltage to the amplifier 18 which will increase the voltage to +400 volts and the amplifier 18 will supply the latter voltage to the deflection wires of the tube 19. At the same time the gating signal $V_h$ of +20 volts will gate the gate 28 to pass the red color signal. The red color signal will thus be applied to the grid of the tube 19 at the same time the electron beam strikes the red phosphor line.

Before the beginning of the second line of the fifth field and every fourth line thereafter, $V_f$ is −20 as shown by Fig. 3G. The switch 16 will deliver a −20 voltage to the amplifier 18 which will increase the voltage to −400 volts and the amplifier 18 will supply the latter voltage to the deflection wires of the tube 19. At the same time the gating signal $V_h$ of −20 volts will gate the gate 25 to pass the blue color signal so that it will be supplied to the grid of the color tube 19 at the same time as the electron beam is deflected against the blue phosphor line.

Before the start of the fourth line of the fifth field and every fourth line thereafter, $V_f$ is 0 as shown by Fig. 3G. The switch 16 will deliver a 0 voltage to the amplifier 18 so that 0 volt will be supplied to the deflection wires of the color tube 19. At the same time the switch 16 will deliver a 0 gating voltage to the gate 27 to pass the green color signal. The green color signal will thus be applied to the grid of the tube 19 at the same time the electron beam strikes the green phosphor line.

Thus during the fifth field the signal will be switched from red to blue, to red, to green, to red, to blue, to red, to green, and so on as shown by Fig. 4.

Before the start of the first line of the sixth field (the second line of the pattern) and every second line thereafter, the voltage $V_e$ will be −20 as shown by Fig. 3H. The switch 16 will deliver a −20 voltage to the amplifier 18 which will increase the voltage to −400 volts and the amplifier 18 will supply the latter voltage to the deflection wires of the tube 19. At the same time the gating signal $V_h$ of −20 volts will gate the gate 25 to pass the blue color signal so that it will be supplied to the grid of the color tube 19 at the same time as the electron beam is deflected against the blue phosphor line.

Before the start of the second line of the sixth field (the fourth line of the pattern) and every fourth line thereafter, $V_e$ is 0 as shown by Fig. 3H. The switch 16 will deliver a 0 voltage to the amplifier 18 so that 0 volt will be supplied to the deflection wires of the color tube 19. At the same time the switch 16 will deliver a 0 gating voltage to the gate 27 to pass the green color signal. The green color signal will thus be applied to the grid of the tube 19 at the same time the electron beam strikes the green phosphor line.

Before the start of the fourth line of the sixth field (the eighth line of the pattern) and every fourth line thereafter, $V_e$ is +20 as shown by Fig. 3H. The switch 16 will deliver a +20 voltage to the amplifier 18 which will increase the voltage to +400 volts and the amplifier 18 will supply the latter voltage to the deflection wires of the tube 19. At the same time the gating signal $V_h$ of +20 volts will gate the gate 28 to pass the red color signal. The red color signal will thus be applied to the grid of the tube 19 at the same time the electron beam strikes the red phosphor line.

Thus during the sixth field the signal will be switched from blue to green, to blue, to red, to blue, to green, to blue, to red, and so on as shown by Fig. 4.

This completes the first color switching period. There is a similar period between the seventh and twelfth fields, and between the thirteenth and eighteenth fields, and so on. It will be noted that after every sixth field, every line in a picture has been presented in all three primary colors.

The switching sequence eliminates noticeable color crawl. Actually, there is upward crawl between odd and even fields, and downward crawl between even and odd fields, but the net effect is that visible crawl is cancelled out.

In order to reduce flicker it may be desirable to reduce the gain in the green channel by a factor of two during fields when the number of green lines is twice the number of blue and red lines, and similarly to reduce the gain in the red and blue channels by a factor of two during fields when the number of red and blue lines is twice the number of green and blue and red and green lines respectively. This could be accomplished by providing a three sector switch similar to the switch 16 and rotating in synchronism with it. The outputs of the three sectors of this additional switching means would feed red, green and blue amplifiers which may be located in the red, green and blue color signal channels respectively. These outputs would control the respective gains of the amplifiers. The input to the rotor of such a switch may be supplied from a convenient direct current source. In like manner and for a similar purpose, a switching means similar to the switch means of Fig. 5 may be utilized in that embodiment of this invention.

The high frequency brightness information may be fed to the cathode of tube 19, or added to the three color signals either before or after gating.

Although this invention has been described in Fig. 1 with reference to a deflection focus grid type color tube, it will be obvious that the switching sequence is applicable to any tube in which colors can be displayed in a line sequential fashion. For example, the tube which is the subject matter of Figs. 1 and 2 of the copending application of A. P. Kruper and myself, Serial No. 411,382, filed February 19, 1954, may use this form of line sequential presentation.

Figure 5:
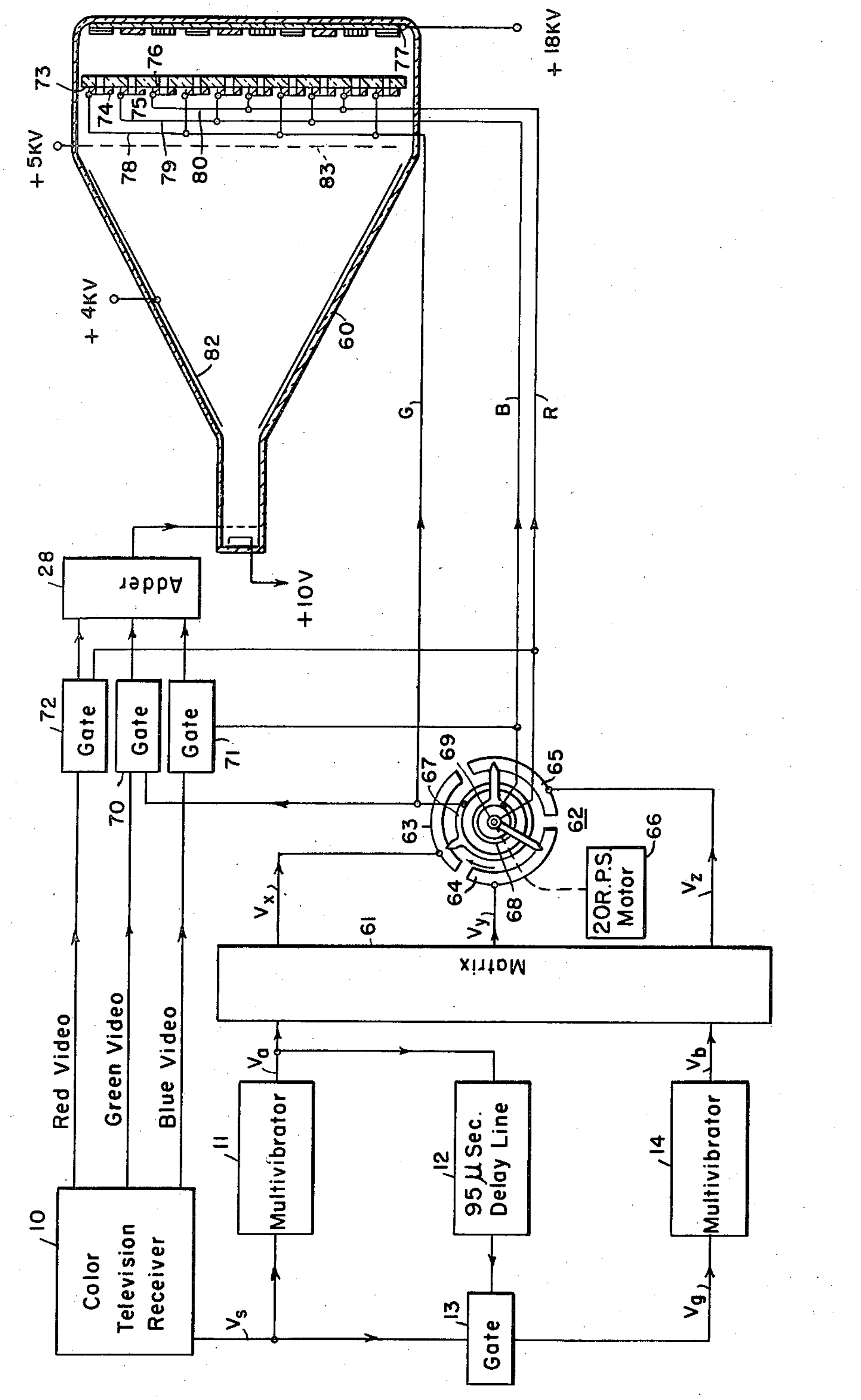
Fig. 5 is a block diagram illustrating another embodiment of this invention.

Referring to Fig. 5, in detail, the numeral 60 designates the color tube referred to in the above copending application. The signals $V_a$ and $V_b$ are derived in a manner similar to that described with reference to Fig. 1 and are delivered to a matrix 61 to provide three output signals $V_x$, $V_y$ and $V_z$, in which:

$$V_x = +20 - \frac{V_a}{2} + \frac{V_b}{2}$$

$$V_y = \frac{V_a}{2}$$

$$V_z = -\frac{V_b}{2}$$

Figure 3J:
Figure 3L:
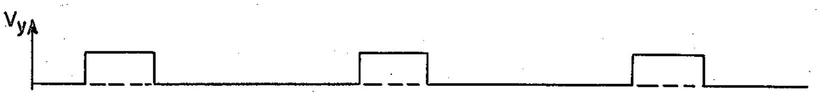
Figure 3M:
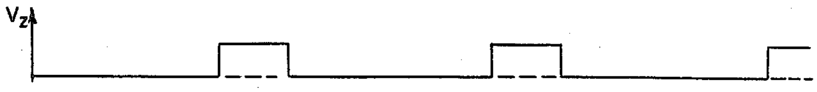

The wave forms of $V_x$, $V_y$ and $V_z$ are illustrated by Figs. 3J, 3L and 3M respectively.

The voltages $V_x$, $V_y$ and $V_z$ are supplied to switch sectors 63, 64 and 65 respectively of a three-position, three-pole switch 62 which is rotated at 20 C. P. S. by a motor 66. The switch 62 has three rotors 67, 68 and 69. The rotor 67 is connected to a green gate 70; the rotor 68 is connected to a blue gate 71; and the rotor 69 is connected to a red gate 72. The gates 70, 71 and 72 are identical, and may be similar to the gate 27 of Figs. 1 and 2. When no voltage is applied to these gates they will be closed and when a positive 20 volts is applied to them they will open and thus allow the video color signal to pass to the adder 28.

The color tube 60 has a color control grid structure 73 comprising three sets of perforated conducting strips 74, 75 and 76 which are positioned adjacent to a phosphor screen 77. The screen 77 comprises a plurality of green, blue and red phosphor stripes. The conducting strips 74 which are positioned opposite the green phosphor stripes are all connected together by a conductor 78 and are connected on the outside of the tube to the rotor 67. The conducting strips 75 which are positioned opposite the blue phosphor stripes are all connected together by the conductor 79 and are connected on the outside of the tube to the rotor 68. The conducting strips 76 which are positioned opposite the red phosphor stripes are all connected together by the conductor 80 and are connected on the outside of the tube to the rotor 69. The tube achieves a lens action by applying proper voltages to the conductive coating 82 and to the unipotential grid structure 83. The cathode of the tube is at a slight positive potential so that with zero voltage applied to the conductors 78, 79 and 80, electrons will not pass through the color control grid 73 to the phosphor screen 77.

Assume before the start of the first horizontal line of the first field, the color is to be switched to green. The first sync pulse will start horizontal trace. At the same time the voltage $V_x$ will be +20, as illustrated by Fig. 3J. Assuming the rotor 67 of the switch 62 touches the forward edge of the switch sector 63 at this time, to which sector the voltage $V_x$ is delivered from the matrix 61, then the switch 62 will deliver a voltage $V_x=+20$ to the conductor 78 of the tube 60. At the same time, the gating signal $V_x=+20$ will gate the gate 70 to pass the green color signal. At the same time the voltage $V_y$ will be 0, as illustrated by Fig. 3L. The rotor 69 will touch the forward edge of the sector 64, to which sector the voltage $V_y$ is delivered from the matrix 61, and the switch 62 will deliver a voltage $V_y=0$ to the conductor 80 and to the gate 72. At the same time the voltage $V_z$ will be 0, as illustrated by Fig. 3M. The rotor 68 will touch the forward edge of the sector 65, to which sector the voltage $V_z$ is delivered from the matrix 61, and the switch 62 will deliver a voltage $V_z=0$ to the conductor 79 and to the gate 71. The voltages $V_y$ and $V_z$ will not gate the gates 72 and 71 respectively and since the cathode of the tube 60 is at a slight positive voltage, electrons will not pass through the color control grid 73 to the blue and red phosphor stripes on the screen 77. The electron beam will strike the green phosphor stripe at the same time the green color signal is applied to the grid of the color tube.

From the preceding description, it is apparent from an examination of Figs. 3J, 3L and 3M that the same switching sequence described in detail with reference to Fig. 1 can be accomplished in the Fig. 5 embodiment of this invention.

While I have shown my invention in preferred embodiments, it will be obvious to those skilled in the art that it is not so limited, but is susceptible of various changes and modifications without departing from the spirit thereof.

I claim as my invention:

1. A color television receiver having horizontal and vertical sync pulse generators for providing pulses for sychronizing horizontal and vertical sweeps comprising: a color tube of the line sequential type having a control electrode, a cathode, a phosphor screen having primary color phosphor lines, and means for controlling the passage of the electron beam from said cathode to said phosphor lines; a plurality of gates connected to said control electrode; means for applying primary color signals to said gates; means including means initiated by sync pulses from said horizontal generator for generating a plurality of voltages in synchoronism with said generator, and means including switching means operable at the field rate of said receiver for applying said voltages to said gates and to said control means to thereby provide a line sequential display in which the number of phosphor lines of a particular primary color impinged by the electron beam during a predetermined field is equal to the number of phosphor lines of the other primary colors impinged by the electron beam during said predetermined field, and phosphor lines of a different particular primary color are impinged by the electron beam in successive fields.

2. A color television receiver as claimed in claim 1 in which means is provided for increasing the voltages before they are applied to the control means.

3. A color television receiver having horizontal and vertical sync pulse sources for providing pulses for synchronizing horizontal and vertical sweeps comprising: a color tube of the line sequential type and having a control electrode, a cathode, a phosphor screen having primary color phosphor lines, and means for controlling the passage of the electron beam from said cathode to said lines; a plurality of gates connected to said control electrode; means for applying primary color signals to said gates; means including means initiated by a sync pulse from said horizontal source for providing a first voltage in phase with said pulse and having a duration equal to one horizontal sweep period, and for providing a second voltage which starts two horizontal sweep periods after the start of said first voltage, which has a duration equal to one horizontal sweep period, and which has a polarity opposite to that of said first voltage; matricing means using said voltages for producing three voltages in synchronism with the frequency of said horizontal source, and means including switching means operable at the field rate of said receiver for applying said three voltages to said gates and to said control means to thereby provide a line sequential display in which the number of phosphor lines of a particular primary color impinged by the electron beam during a predetermined field is equal to the number of phosphor lines of the other primary colors impinged by the electron beam during said predetermined field, and phosphor lines of a different particular primary color are impinged by the electron beam in successive fields.

4. A color television receiver as claimed in claim 3 in which means is provided for increasing the three voltages before they are applied to the control means.

5. A color television receiver having horizontal and vertical sync pulse generators for providing pulses for synchronizing horizontal and vertical sweeps comprising: a color tube of the line sequential type and having a control electrode, a cathode, a phosphor screen having primary color phosphor lines, and means for controlling the passage of the electron beam from said cathode to said lines; a plurality of gates connected to said control electrode; means for applying primary color signals to said gates; means including means initiated by a sync pulse from said horizontal generator for providing a first voltage in phase with said pulse and for providing another voltage after said first voltage and having a polarity opposite to the polarity of the first voltage; means using said voltages for producing three voltages in synchronism with said horizontal generator, and means including switching means operable at the field frequency of said receiver for applying said three voltages to said gates and to said control means to thereby provide a line sequential display in which the number of phosphor lines of a particular primary color impinged by the electron beam during a predetermined field is equal to the number of phosphor lines of the other primary colors impinged by the electron beam during said predetermined field, and phosphor lines of a different particular primary color are impinged by the electron beam in successive fields.

6. A color television receiver as claimed in claim 5 in which means is provided between said switching means and said control means for amplifying said three voltages.

7. A color television receiver having horizontal and vertical sync pulse generators for providing pulses for synchronizing horizontal and vertical sweeps comprising: a color tube of the line sequential type having a first and a second control electrode; a plurality of gates connected to said first control electrode; means for applying primary color signals to said gates; means including means initiated by sync pulses from said horizontal generator for generating a plurality of voltages in synchronism with said horizontal generator; and means including switching means operable at the field rate of said receiver for applying said voltages to said gates and to said second control electrode to thereby provide a line sequential display in which the number of phosphor lines of a particular primary color impinged by the electron beam during a predetermined field is equal to the number of phosphor lines of the other primary colors impinged by the electron beam during said predetermined field, and phosphor lines of a different particular primary color are impinged by the electron beam in successive fields.

8. A color television receiver as claimed in claim 7 in which means is provided between the switching means and the second control electrode for amplifying the voltages applied to said second control electrode.

9. A color television receiver as claimed in claim 7 in which the voltages have periods equal to four horizontal sweep periods.

10. A color television receiver as claimed in claim 3 in which the three voltages have periods equal to four horizontal sweep periods.

11. A color television receiver as claimed in claim 5 in which the three voltages have periods equal to four horizontal sweep periods.

12. A color television receiver as claimed in claim 7 in which the means for generating a plurality of voltages includes means for generating two voltages having periods equal to four horizontal sweep periods and having opposite polarities, one of said two voltages starting two sweep periods after the other of the two voltages, and in which means using the two voltages generates the said plurality of voltages.

13. A color television receiver as claimed in claim 12 in which the plurality of voltages have periods equal to four horizontal sweep periods.

14. A color television receiver having horizontal and vertical sync pulse generators for providing pulses for synchronizing horizontal and vertical sweeps comprising: a color tube having a first and a second control electrode; a plurality of gates connected to said first control electrode, means for applying primary color signals to said gates; means including means initiated by a sync pulse from said generator for providing a first voltage coincident with and in phase with said pulse, said voltage having a positive value for one horizontal sweep period followed by a zero value for three horizontal sweep periods, and followed by a second positive value for one horizontal sweep period, said means initiated by said sync pulse providing a second voltage similar to said first voltage but out of phase therewith and starting two horizontal sweep periods after the start of said first voltage; matricing means using said voltages for producing three voltages in synchronism with said horizotnal generator; means including switching means operable at the field rate of said receiver for applying said three voltages to said gates, and means connecting said switching means to said second control electrode to thereby provide a line sequential display in which the number of phosphor lines of a particular primary color impinged by the electron beam during a predetermined field is equal to the number of phosphor lines of the other primary colors impinged by the electron beam during said predetermined field, and phosphor lines of a different particular primary color are impinged by the electron beam in successive fields.

15. A color television receiver as claimed in claim 14 in which the means connecting the switching means and the second control electrode includes means for amplifying the three voltages.

References Cited in the file of this patent

UNITED STATES PATENTS

| | | |
|---|---|---|
| 2,650,264 | Weimer | Aug. 25, 1953 |
| 2,704,783 | Sziklai | Mar. 22, 1955 |
| 2,705,257 | Lawrence | Mar. 29, 1955 |
| 2,744,952 | Lawrence | May 8, 1956 |
| 2,759,992 | Kindred | Aug. 21, 1956 |
| 2,759,993 | Loughlin | Aug. 21, 1956 |